INVENTOR.
HERBERT G. JOHNSON
BY
MARTIN S. BAER
ATTORNEY

Oct. 26, 1971    H. G. JOHNSON    3,614,811
DIAPHRAGM-TYPE FORM-SHAPING APPARATUS
Filed Aug. 13, 1969    2 Sheets-Sheet 2
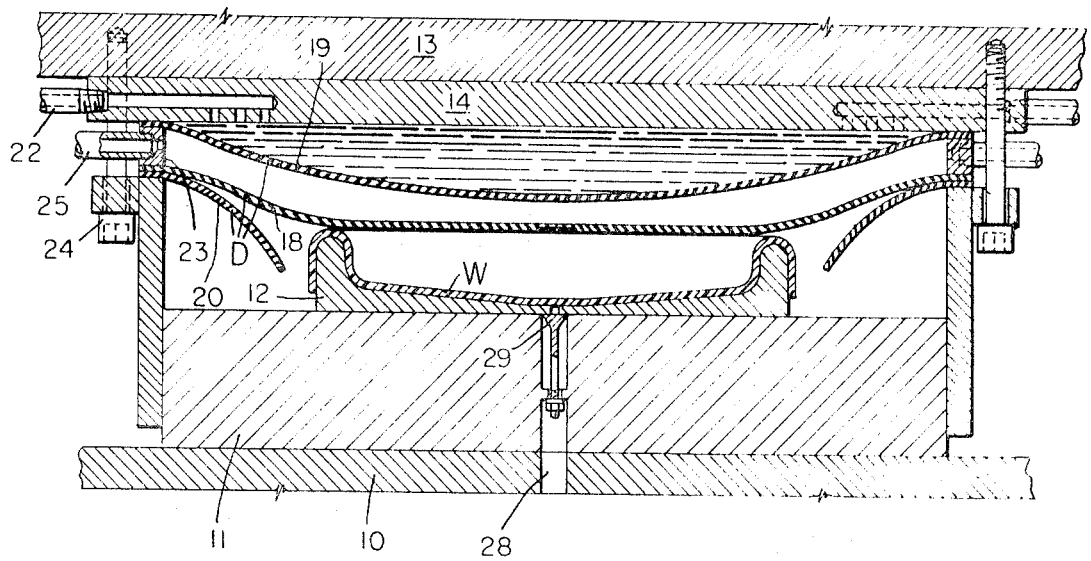
_Fig.3_
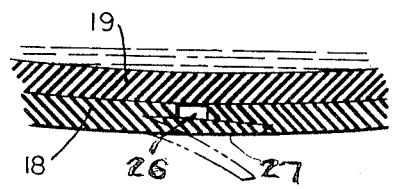
_Fig.4_
INVENTOR.
HERBERT G. JOHNSON
BY
MARTIN S. BAER
ATTORNEY

United States Patent Office 3,614,811
Patented Oct. 26, 1971

3,614,811
DIAPHRAGM-TYPE FORM-SHAPING APPARATUS
Herbert G. Johnson, Havertown, Pa., assignor to Shell Oil Company, New York, N.Y.
Continuation-in-part of application Ser. No. 815,127, Apr. 10, 1969. This application Aug. 13, 1969, Ser. No. 849,699
Int. Cl. B29c *17/04*
U.S. Cl. 18—19 F            6 Claims

ABSTRACT OF THE DISCLOSURE

This application discloses diaphragm-type apparatus and method for form-shaping material, especially plastic sheet material in dies. The apparatus comprises elastomeric diaphragm means which is forced by pressure fluid against confined material, such as a sheet of plastic material against a rigid die, to form the material, the diaphragm means comprising a plurality of layers or laminae with the layer which engages the material having an opening through it to admit fluid between it and the material to separate it from the material after the forming operation has been completed.

RELATED APPLICATIONS

In my copending application Ser. No. 660,491, filed Aug. 14, 1967, now Pat. 3,546,740, issued Dec. 15, 1970, there is disclosed apparatus and method for forming material by a pressure diaphragm having means for introducing fluid between the diaphragm and workpiece after it has been formed to separate the diaphragm from the workpiece to avoid injury to the diaphragm or workpiece. The method of said copending application is now the subject of a continuation-in-part thereof, Ser. No. 815,127, filed Apr. 10, 1969.

BACKGROUND OF THE INVENTION

In the apparatus disclosed in my copending application a flexible elastic tube was attached to the forming diaphragm and when the forming operation was completed fluid was forced through the tube into the space between the diaphragm and workpiece to separate them.

SUMMARY OF THE INVENTION

According to the present invention, two diaphragm layers or laminae are used, the inner diaphragm which engages the material being perforate and the outer diaphram being imperforate. Forming pressure fluid is applied to the outer side of the outer diaphragm to form the material; and after formation, pressure fluid is applied between the diaphragm layers to force the outer layer away from the inner layer and discharge the forming fluid and to introduce fluid between the inner layer and workpiece to separate them. Preferably, the opening through the inner layer is provided with a flap to avoid forming a hole mark blemish on the material; and means are provided for the outflow of separating fluid from the interspace so that the proper introduction of the separating fluid is assured. Means are also provided for introducing pressure fluid behind the formed article to eject it without marring it.

One of the objects of the invention is to provide apparatus and method of a simple dependable nature for forming material by diaphragm means and readily separating the diaphragm means from the material after formation.

Another object is to provide diaphragm-type apparatus and method for quickly removing forming pressure fluid, especially where it is a liquid fluid, so the material or workpiece can be readily removed.

Another object is to provide apparatus and method which will not mar the formed material or workpiece.

DRAWINGS

The above and other objects of the invention, as well as various features of novelty and advantages of the invention, will be apparent from the following description of an exemplary embodiment of the invention, reference being made to the accompanying drawings, wherein:

FIG. 3 is a view like FIG. 1 but showing the parts at a stage when fluid has been introduced between layers of the diaphragm means to push back the outer layer and expel forming pressure fluid and to separate the inner diaphragm layer from the formed material or workpiece.

FIG. 4 is an enlarged partial sectional view of the aperture zone of the inner layer, the view being taken in the zone 4—4 of FIG. 1.

DESCRIPTION OF A SPECIFIC EMBODIMENT

The apparatus illustrated is intended to be used with existing press apparatus in a plant having the usual pressure fluid supplies, both gas and liquid, electrical supply, and blank heating facilities, either for preheating a blank or heating it at the die or both. Illustration of such equipment is omitted.

Figure 1:
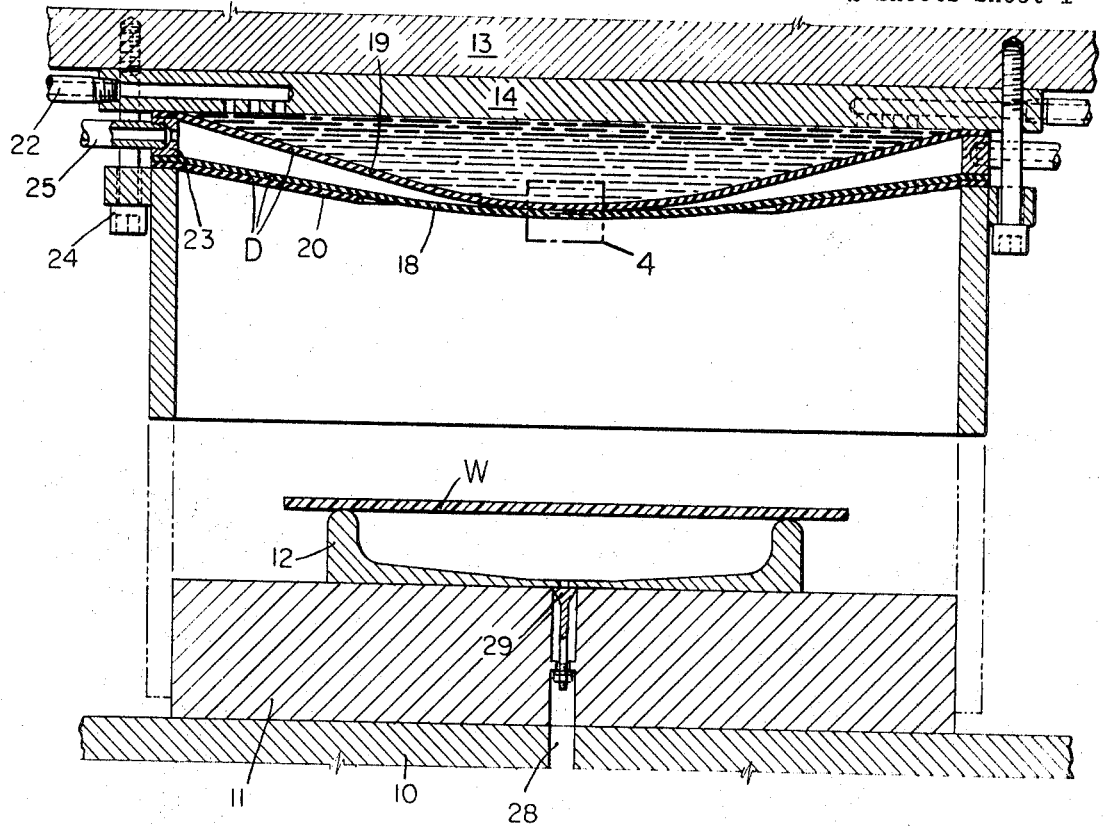
FIG. 1 is a central vertical section of an axially symmetrical sheet-forming apparatus in closed position ready to form a sheet blank into an article in a die.

There is shown a fixed press part 10 carrying a support 11 for a die 12 and a movable die part 13 carrying an attached plate 14 which, in turn, carries an enclosing guide ring 15 which fits around the die support 11. The die may be of various forms, with either concave or convex portions or both, but a die of general concave form is shown. A sheet blank or workpiece W, either plain or laminated, or either homogeneous or of different layers, is shown in FIG. 1 on the die in position to be formed.

Forming diaphragm means D is provided and here includes an inner diaphragm layer or lamina 18, an outer layer 19, and a protective annular skirt 20.

Conduit means 22 are provided on the plate 14 for supplying and removing pressure forming fluid to and from the space between the diaphragm layer 19 and the plate 14. This fluid may be in liquid or gaseous form or both, with the gaseous fluid moving the liquid fluid. A space filling liquid fluid moved by a gaseous fluid, like air, has been found to be very efficient, the liquid assisting the diaphragm to fill out the forming space and the air providing rapid and resilient action. Sump means, not shown, will be provided for the liquid.

Figure 2:
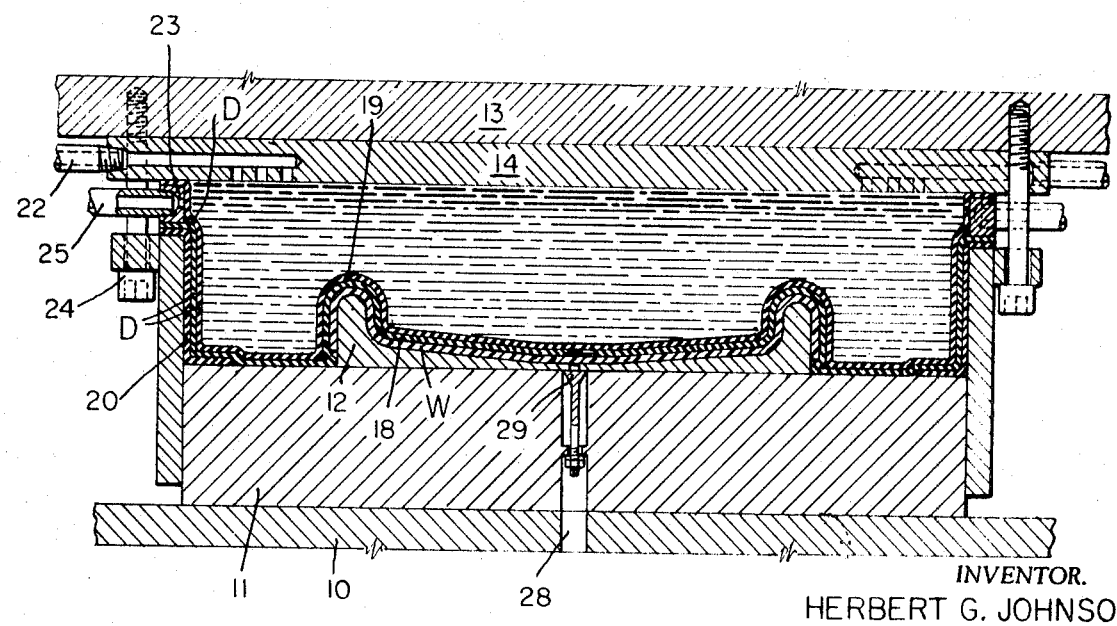
FIG. 2 is a view like FIG. 1 but showing the parts after the article has been formed.

The inner (here lower) diaphragm layer 18 is preferably spaced from the outer or upper diaphragm layer 19 by an annular spacing ring 23 secured between the plate 14 and ring 15 by set screws or bolts 24. The space provides for rapid flow of fluid. The spacing ring 23 is provided with one or more fluid conduit means 25 for supplying and removing separating fluid, preferably a gaseous fluid like air, between the diaphragm layers 18 and 19. The annular skirt 20, as best shown in FIG. 2, prevents the main forming diaphragm layers from being pinched and damaged by being forced into sharp corners when these are present on the apparatus. In the apparatus shown, the fit between the ring 15 and the part 11 is close enough for proper telescopic guidance but is preferably not fluid-tight so that separating fluid is allowed to escape here when the diaphragm elements have been moved away, as shown in FIG. 3.

The conduit means 22 and 25, being on a movable assembly, will be provided with movement accommodat-

OPERATION

FIG. 1 shows the parts in starting position where liquid, such as water, has been supplied above the diaphragm means to cause it to sag at the axis so as to engage the workpiece W more accurately.

FIG. 2 shows the parts after the press units have been brought together and the blank W shaped to form the article W1.

FIG. 3 shows the parts after the outer or upper diaphragm layer 19 has been separated and most of the forming fluid discharged. The inner diaphragm layer 18 has been separated from the formed workpiece by injecting separating fluid through conduit 25 between the diaphragm layers. The annular diaphragm skirt 20 has been raised so that separating fluid can escape to make the separation more effective and complete over and around the entire article.

FIG. 4 shows how the aperture 26 in the diaphragm layer 18 may be covered during the forming action, as by a space-filling flap 27, to provide a smooth surface facing the workpiece and avoid leaving a forming blemish thereon.

Means are provided for ejecting the formed workpiece easily and without marring it, the means here shown comprising a pressure fluid conduit 28 with a poppet closure 29 presenting a smooth surface to the workpiece during formation.

Alternatively, forming pressure through the forming fluid may be supplied through the press action alone or almost alone by confining a body of liquid or even air behind the diaphragm and bringing the press parts together to cause the diaphragm to engage the workpiece to shape it, the confined fluid under pressure causing the diaphragm to conform fully to the shape which the workpiece is permitted to take.

When the press parts are separated the extensive size of the diaphragm, as compared to the workpiece and die in the form illustrated, causes the diaphragm to tend to peel off from the edges. However, even here the dual layer arrangement will aid the separation by introducing separating fluid between the diaphragm layers and between the contacting layer and the workpiece, particularly when rapid separation is effected.

The apparatus hereby provided is very simple and inexpensive, easily assembled, and durable in service. The method is also simple and effective. They provide for quick and safe separation of the formed product even when thin and fragile and without damage to the diaphragm means.

While illustrative embodiment of the invention has been described for purposes of illustration, it is to be understood that there may be various embodiments and modifications within the general scope of the invention.

I claim:

1. Diaphragm-type form-shaping apparatus, comprising in combination, a support unit in which material is to be formed, a plurality of elastic deformable diaphragm layers for forming the material in the supporting unit, the inner one of said diaphragm layers which engages the material having an aperture for introducing fluid between the material and said diaphragm layer, and the outer one of said diaphragm layers being imperforate, means for introducing forming pressure fluid behind said outer diaphragm layer to form the material, and means for introducing separating pressure fluid between said diaphragm layers after the material has been formed to force back the outer diaphragm layer and to introduce separating fluid between said inner diaphragm layer and the formed material to separate them.

2. Apparatus as set forth in claim 1, which further comprises, mounting means including a spacer ring between said diaphragm layers.

3. Apparatus as set forth in claim 1, further characterized by the fact that said inner diaphragm is provided with a liftable covering over the aperture on the material-facing side to avoid forming a blemish on the material.

4. Apparatus as set forth in claim 1, further characterized by the fact that said diaphragm layers are disposed above the material to be formed and that the means for introducing separating fluid introduces liquid fluid for weighting said diaphragm layers.

5. Apparatus as set forth in claim 1, which further incldes an annular skirt diaphragm layer disposed around the outer periphery of said inner and outer diaphragm layers to protect them from injury by pinching when forced into sharp corners and to aid in their retraction from forming position.

6. Apparatus as set forth in claim 1, which further comprises, means for introducing pressure fluid behind the formed material to eject it, and means for protecting the material from blemish at the injection outlet of said ejection pressure fluid to said material.

References Cited

UNITED STATES PATENTS

| | | | |
|---|---|---|---|
| 2,565,949 | 8/1951 | Clifford, et al. | 264—313 X |
| 2,962,776 | 12/1960 | Taccone | 164—170 |
| 3,156,958 | 11/1964 | Miller, et al. | 18—DIG 19 |

J. SPENCER OVERHOLSER, Primary Examiner

L. R. FRYE, Assistant Examiner

U.S. Cl. X.R.

264—314